United States Patent Office 3,054,756
Patented Sept. 18, 1962

3,054,756
POLYURETHANE PLASTIC PREPARED FROM PHOSPHOROUS CONTAINING ISOCYANATES AND COMPOUNDS CONTAINING ACTIVE HYDROGEN ATOMS
Hans Holtschmidt, Koln-Stammheim, and Günther Braun, Leverkusen, Germany, assignors to Farbenfabriken Bayer Aktiengesellschaft, Leverkusen, Germany, a corporation of Germany
No Drawing. Filed Mar. 16, 1959, Ser. No. 799,449
Claims priority, application Germany Mar. 22, 1958
14 Claims. (Cl. 260—2.5)

This invention relates to improved polyurethane plastics and processes for the preparation thereof. More particularly, this invention relates to improved polyurethane plastics derived from phosphorous containing isocyanates and compounds containing active hydrogen atoms.

Polyurethane plastics have found widespread commercial applications as rigid, semi-rigid and flexible porous and nonporous plastics useful as lacquers, films, foils, molding compositions, adhesives and textile coatings. The preparation of the foregoing finished products as well as some intermediates involves essentially a polyaddition process wherein an organic hydrocarbon polyisocyanate is reacted with a compound having at least two hydrogen atoms reactive with and —NCO group. In other words, the polyurethane plastics are prepared by linking together compounds having reactive hydrogen atoms to form chains which may be either linear or branched. The polyurethane plastics prepared by this process from organic hydrocarbon polyisocyanates, while they have found many commercial applications, nevertheless suffer from the disadvantage that once ignited they will support combustion without additional heat being applied. Further, these organic hydrocarbon polyisocyanate base materials often have unsatisfactory color characteristics. Not only are the raw materials often violet or bluish-violet in color but they also often change color on exposure to light. Another disadvantage of the organic hydrocarbon polyisocyanate base polyurethane rubbers is their tendency to soften at relatively low temperatures.

Another type of product has been heretofore prepared by first polymerizing an hydroxyl containing polymer with a phosphate compound to produce an hydroxyl terminated polymer containing phosphate groups which is thereafter reacted with an aromatic diisocyanate dimer. The phosphorous containing product contains phosphate groups bonded to the aromatic portion of the dimerized isocyanate through urethane linkages. Of course, the dimerized isocyanate molecule is split by temperatures above about 110° C., freeing the isocyanate for further reaction. These phosphorous containing products have been used to produce flame resistant coatings on textiles by applying an organic solvent solution of the product to the textile and thereafter heating the coated textile to split the dimeric portion of the molecule and allow the free isocyanato groups to react with active hydrogen atoms on the surface of the textile. While these heretofore known phosphorous containing products composed of a phosphate entity and dimerized isocyanate entity linked through a urethane group will impart increased flame resistance to textiles, they may not be used as reactants in the production of polyurethane plastics by the aforementioned polyaddition process because they do not contain free isocyanate for reaction with active hydrogen containing compounds at ordinary temperatures. Further, these heretofore known polymers containing phosphorous and dimerized isocyanato groups are relatively expensive. That is, one-half of the isocyanate content of the basic raw materials is consumed in the production of the intermediate. Still further, while the known phosphorous compounds have improved flame resistance, improved resistance to elevated temperatures has not been demonstrated. The improvement in the thermal stability of polyurethane plastics could not be obtained with these products because they cannot be used to prepare polyurethane plastics by the polyaddition process.

It is an object of this invention to provide improved polyurethane plastics and a process for the preparation thereof. Another object of this invention is to provide improved polyurethane plastics derived from phosphorous containing isocyanates. Still another object of this invention is to provide polyurethane plastics having improved thermal stability. A further object of this invention is to provide nonporous polyurethane plastics with improved physical properties. Still another object of this invention is to provide porous polyurethane plastics with improved physical properties.

The foregoing objects and others, which will become apparent from the following description, are accomplished in accordance with the invention, generally speaking, by providing polyurethane plastics derived from compounds having at least two hydrogen atoms reactive with an —NCO group and phosphorous containing polyisocyanates having the formula

wherein X is oxygen or sulphur, R represents O-aryl, O-aralkyl, O-alkaryl, O-indenyl, S-aryl, S-aralkyl, S-alkaryl, S-indenyl, N-(aryl)$_2$, N(alkyl)(aryl), N(alkaryl)$_2$, N(aralkyl)$_2$, or N-(indenyl)$_2$; R' and R" may be either the same or different and may be R as defined above, O-alkyl, O-cyclopentadienyl, S-alkyl, S-cyclopentadienyl, N-(alkyl)$_2$, or N-cyclopentadienyl)$_2$; at least two aromatically bonded —NCO groups being present in the molecule.

The phosphorous containing isocyanates employed in accordance with the invention may be prepared, for example, according to the process disclosed and claimed in copending application Serial No. 789,810, filed January 29, 1959, now Patent No. 3,013,048. Any suitable phosphorous containing isocyanate as represented by the foregoing formula may be used in accordance with this invention. Examples of phosphorous containing isocyanates contemplated by the invention are, for example:

p-Isocyanato phenyl phosphoric acid triester
p-Isocyanato phenyl thiophosphoric acid triester
p-Isocyanato benzyl phosphoric acid triester
p-Isocyanato benzyl thiophosphoric acid triester
Ethyl-4,4'-isocyanato phenyl phosphoric acid triester
Ethyl-4,4'-isocyanato phenyl thiophosphoric acid triester
Cyclopentadienyl-2,4-isocyanato phenyl phosphoric acid diester dimethyl amide
Cyclopentadienyl-2,4-isocyanato phenyl thiophosphoric acid diester dimethyl amide
Ethyl, vinyl, 2,4-isocyanato naphthyl phosphoric acid triester
Ethyl, vinyl, 2,4-isocyanato naphthyl thiophosphoric acid triester
Ethyl phosphoric acid ester-bis (N-methyl-N-4-isocyanato phenyl amide)
Ethyl thiophosphoric acid ester-bis (N-methyl-N-4-isocyanato phenyl amide)
(3-isocyanato-5-methyl phenyl) phosphoric acid triester
(3-isocyanato-5-methyl phenyl) thiophosphoric acid triester
(3-isocyanato-5-methyl phenyl) dithiophosphoric acid triester
4,4',4" triisocyanato phenyl dithiophosphate
4,4',4" triisocyanato phenyl tetrathiophosphate
4-isocyanato, 6-chlorophenyl phosphoric acid triester 4-isocyanato, 6-chlorophenyl thiophosphoric acid triester Indenyl-4-isocyanato phenyl phosphoric acid diester, N,N-indenyl amide Ethyl dithiophosphoric acid ester-bis (N,N-4-isocyanato phenyl amide)

4,4',4'' triisocyanato indenyl trithiophosphate 4,4' diisocyanato phenyl phosphoric acid diester, N,N-cyclopentadienyl amide 4,4',4'' triisocyanato benzyl dithiophosphate Phenyl phosphoric acid ester bis (N,N-4-isocyanato phenyl amide)

Phenyl phosphoric acid ester bis (N,N-3-isocyanato, 5-methyl phenyl amide)

Phenyl phosphoric acid diester, N,N-4-isocyanato benzyl amide

Cyclopentadienyl dithiophosphoric acid ester bis (N,N-4-isocyanato phenyl)amide, and the like The substituents in the above-mentioned general formula may also contain further substituents, such as, for example, halogen, such as, chlorine, iodine, bromine and the like; alkoxy, such as, for example, methoxy, ethoxy, propoxy and the like; carboxylic acid ester, such as, for example, carbomethoxy, carboethoxy, carbobutoxy and the like and unsaturated hydrocarbon, such as, for example, vinyl, allyl, butenyl and the like, in addition to the isocyanato groups which are attached to a carbon atom of an aromatic ring. Further, isocyanato derivatives containing more than one phosphoric acid or thiophosphoric acid nucleus are contemplated by the invention. In such cases, R' and R'' may represent radicals of polyhydric alcohols, such as, for example, ethylene glycol, 1,3-propylene glycol, 1,4-butylene glycol, trimethylol propane, pentaerythritol and the like, polyvalent amines, such as, for example, ethylene diamine, 1,3-propylene diamine, 1,4-butylene diamine and the like, linear or branched polyesters, such as, for example, the reaction product of succinic acid with trimethylol propane or ethylene glycol and the like, polyethers, such as, for example, those obtained from the condensation of alkylene oxides, such as, for example, ethylene oxide, propylene oxide, butylene oxide and the like and compounds such as diethylene glycol, polyamides, such as, for example, ethyl, propyl and butyl amides and the like, polyester amides, such as, for example, the reaction product of succinic acid with amino alcohols and more particularly 1-amino, 2-hydroxyl ethylene and the like and polythioethers, such as, for example, thioglycols, such as, for example, thiodiglycol and the like which link two or more phosphoric acid or thiophosphoric acid nuclei through oxygen, sulfur and/or nitrogen atoms. Representative compounds of this type contemplated by the invention are, for example, those having the following formulae:

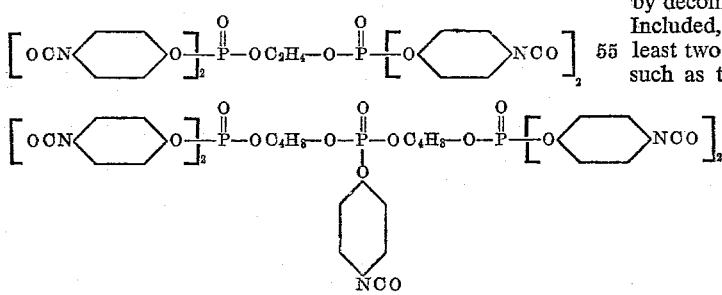

As is evident from the foregoing examples, the phosphorous containing isocyanates more fully described above include isocyanato aryl derivatives of phosphoric and thiophosphoric acid wherein the phosphate entity is bonded to the aromatically bonded isocyanate entities through radicals containing oxygen, sulfur and/or nitrogen bridges as opposed to urethane linkages. The term "aromatically bonded —NCO groups" is intended to include isocyanato groups bonded to any aromatic carbon atom in the foregoing formula. Thus, the isocyanato radical may be bonded to any carbon atom of a benzene ring system present in the molecule. In the foregoing generic formula, one or more isocyanato radicals are attached to an aromatic carbon atom of the radicals represented by R. However, all such radicals need not contain an isocyanato radical. It is essential, as previously stated, to have at least two aromatically bonded isocyanato radicals in the molecule. Further, it is preferred to have only aromatically bonded isocyanato radicals present. Aliphatically bonded isocyanato radicals are difficult to introduce into the molecule and are much less reactive than the aromatically bonded isocyanato radicals.

The invention also contemplates the use of substances which split off isocyanates, such as, for example, adducts of the aforementioned phosphorous containing isocyanates. These adducts can be prepared, for example, by reaction of the phosphorous containing isocyanates with an organic compound containing an alcoholic or a phenolic OH group, such as, for example, phenols or malonic esters as well as according to the process disclosed in United States Patent 2,683,144 to Balon et al., issued July 6, 1954.

The dimerized phosphorous containing isocyanates as well as trimerized derivatives, and the like as represented by the foregoing generic formula are different from the heretofore known polymeric phosphorous containing isocyanates in that there are no urethane linkages interposed between the phosphate portion of the molecule and the isocyanato radical. Further, the dimerized phosphorous containing isocyanates of this invention yield products having improved thermal stability at relatively high temperatures.

In the preparation of the improved polyurethane plastics of the invention, any suitable compound containing at least two hydrogen atoms reactive with an —NCO group may be used. The molecular weight and the extent of branching within the compound containing reactive hydrogen atoms will strongly influence the properties of the resulting product. It is preferable to employ at least one organic compound containing at least two hydrogen atoms reactive with an —NCO group and having a molecular weight of at least about 800. Compounds having a molecular weight from about 1000 to about 10,000, an hydroxyl number from about 20 to about 225 and where applicable, an acid number not substantially greater than about 5 are preferred. Most preferred are those compounds which have a molecular weight within the range of from about 1500 to about 2000, an hydroxyl number not substantially greater than about 56 and, where applicable, an acid number within the range of about 0 to about 2. Thus, any suitable compound which contains at least two reactive hydrogen atoms as determined by the Zerewitinoff method (i.e. when added to a Grignard solution of methyl iodide, will liberate methane by decomposition of the Grignard solution) may be used. Included, then, are organic compounds containing at least two hydrogen atoms reactive with an —NCO group such as those found, for example, in OH, $NH_2$ COOH and enolizable carbonyl groups. More particularly, one may use polyesters, polyesteramides, polyacetals, polyethers, polythioethers and the like which contain reactive groups of the class described above. Polyesters may be prepared by well-known processes such as, for example, the condensation of polyhydric alcohols with polycarboxylic acids. Polyester amides may be prepared, for example, by the condensation of polycarboxylic acids with amino alcohols. Polyacetals may be prepared, for example, by the condensation of hydroxyl substituted acetals and the like. Polyethers may be prepared, for example, by the condensation of alkylene oxides and/or polyhydric alcohols. Polythioethers may be prepared, for example, by the condensation of thioglycols and/or thioether glycols and may contain an arbitrary number of thioether groups as well as at least one hydroxyl group in the β or γ position to a sulfur atom.

In the foregoing preparation of the organic compound having reactive hydrogen atoms, one may use ethylene oxide, propylene oxide, butylene oxide, amylene oxide and the like where alkylene oxides are called for. Where polyhydric alcohols are used, one may employ, for example ethylene glycol, 1,3-propylene glycol, 1,4-butylene glycol, glycerol, trimethylol propane and the like. If polycarboxylic acids are called for, one may use, for example, adipic acid, succinic acid, glutaric acid, phthalic acid, tetrahydrophthalic acid, maleic acid and their anhydrides such as phthalic anhydride. If amino alcohols are called for, one may use, for example, ethanol amine, triethanol amine and the like. Where acetals are called for, one may use compounds such as β-hydroxy diethyl acetal.

It is often advantageous to employ, in addition to the higher molecular weight compounds having reactive hydrogen atoms, compounds having a molecular weight below about 500 which have at least two hydrogen atoms reactive with an —NCO group. Examples of compounds of this type include water, polyhydric alcohols, such as, for example, ethylene glycol, propylene glycol, 1,3-butylene glycol, 1,4-butylene glycol, glycerol, trimethylol propane, 1,5-naphthalene-β-hydroxyethylether, and the like, diamines, such as, for example, o-dichlorobenzidine, 2,5-dichlorophenylene diamine, 3,3'-dichlorodiaminodiphenyl methane and the like, carbonamides such as, for example, adipic acid dibutanol amide and the like, urethanes such as, for example, ethylene β-hydroxy ethyl urethane and the like, ureas such as, for example, β-hydroxy ethyl urea, and compounds containing tertiary nitrogen atoms, such as, for example, diethyl ethanol amine.

In accordance with the invention, one may prepare rigid, semi-rigid or flexible porous and nonporous polyurethane plastics depending on the choice of reactants and reaction conditions. Thus, one may prepare high-grade nonporous polyurethane elastomeric materials as well as rigid and flexible porous polyurethane plastics, coatings and molding compositions from the above-described reactants. Elastomeric rubber-like material may be prepared, for example, by reacting under substantially anhydrous conditions compounds having at least two hydrogen atoms reactive with an —NCO group and a molecular weight above about 800 as more fully disclosed above with the phosphorous containing isocyanates of the invention in an amount in excess of that necessary for strictly linear lengthening of the chain to prepare a storage stable intermediate having terminal —NCO groups and thereafter reacting the isocyanate terminated product obtained with a compound having a molecular weight below about 500 more fully disclosed above. In this way, a polyurethane plastic is obtained which may be either shaped immediately or at a later stage. If the chain lengthened material obtained from the compound having a molecular weight above about 800 and the isocyanate are reacted with sufficient water, porous plastics are obtained. On the other hand, lesser amounts of water and the like may be used to prepare nonporous rubber-like plastics, if the water is combined on suitable processing equipment conventionally used in the rubber industry to remove any gases entrapped in the reaction mixture. Suitable processes, techniques and catalysts are disclosed, for example, in United States Reissue Patent 24,514 to Hoppe et al., issued August 12, 1958, and United States Patent 2,729,618 to Müller et al., issued January 3, 1956.

According to a further embodiment of the invention, the predominantly linear condensation of polymerization products containing reactive hydrogen atoms and having a molecular weight above about 800 can be reacted with an excess of the phosphorous containing isocyanates and the resulting product which has free —NCO groups thereafter reacted with an excess of the compounds having a molecular weight below about 500 and containing reactive hydrogen atoms. The active hydrogen atom terminated product can then be reacted with a further quantity or an organic polyisocyanate which may or may not contain phosphorous to obtain a polyurethane plastic having improved thermal stability. It is also possible to proceed in the converse manner preparing the initial product from an organic hydrocarbon polyisocyanate and thereafter reacting it with the phosphorous containing isocyanate to obtain the improved polyurethane plastics of the invention.

In the production of cellular polyurethane plastics, in accordance with the invention, linear or branched condensation or polymerization products containing reactive hydrogen atoms and having a molecular weight of at least about 800 are caused to react with the phosphorous containing isocyanates more fully disclosed above or mixtures thereof with organic hydrocarbon polyisocyanates in the presence of water and an accelerator mixture to produce a cellular polyurethane plastic. Suitable apparatus, procedures, accelerator mixtures and organic polyisocyanates which do not contain phosphorous are disclosed, for example, in United States Reissue Patent 24,514 to Hoppe et al., issued August 12, 1958. It is advantageous to employ a catalyst in the production of cellular polyurethane plastics, such as, for example, N-ethyl morpholine.

Coatings, films and laminated materials may be prepared from condensation or polymerization products containing reactive hydrogen atoms and having a molecular weight above about 800 which are applied to a substrate in conjunction wtih the phosphorous containing isocyanates which may desirably contain dimerized diisocyanate radicals and thereafter allowed to react in the cold or after heating subsequent to evaporating the solvent if the mixtures are applied in a solvent solution. The aforementioned condensation or polymerization products are preferably branched products having a molecular weight above about 800.

According to a still further embodiment of the invention, molding compositions may be prepared if the condensation products having a molecular weight exceeding about 800 and containing active hydrogen atoms are combined with relatively large quantities of fillers, for example, sawdust, chalk, carbon black and/or colloidal silica and the phosphorous containing polyisocyanates and then poured into a mold and allowed to cure. Suitable procedures and catalysts are disclosed in United States Patent 2,729,618 to Müller et al., issued January 3, 1956.

The polyurethane plastics obtained in accordance with the process of the invention show improved thermal stability at relatively elevated temperatures. Further, the polyurethane plastics obtained from the above-described reactants are flame resistant, show good mechanical properties and improved color characteristics. It has been found that polyurethane plastics containing a substantial portion and preferably at least about 10–15% of the phosphorous containing isocyanates more fully disclosed above are flame resistant up to temperatures as high as about 300° C. More particularly, the solutions of these organic polyisocyanates are practically colorless and thus may be used as coatings in various applications where color consideration is important which were heretofore impractical with the highly colored organic hydrocarbon polyisocyanates.

Further working conditions may be found in, for example, "Zeitschrift für Angewandte Chemie" 59 (1948), page 257, and 62, pages 37–66 (1950), or in "Kunststoffe" 40 (1950), pages 3–14, as well as in numerous patent specifications including United States Patent 2,620,516 to Müller, issued December 9, 1952, and United States Patent 2,621,166 to Schmidt et al., issued December 9, 1952.

In order to better describe and further clarify the invention, the following are specific embodiments.

*Example 1*

About 40 parts by weight of a polyester consisting of about 3 mols of adipic acid, about 3 mols of 1,3-butanediol and about 1 mol of trimethylol propane and also about 5 parts by weight of a polyester of adipic acid and trimethylol propane are mixed and dissolved in a solvent mixture consisting of equal parts of toluene and methylene chloride (about 10% solid substance).

To about 100 parts by weight of this polyester solution are added about 23 parts by weight of an approximately 20% solution of p-isocyanato phenyl-phosphoric acid-triester in methylene chloride. Rubber articles are dipped in this solution. After a drying period of approximately 8 hours at room temperature, there is obtained a firmly adhering, lustrous and extremely flexible coating layer, which is flame-resistant, and imparts a more pleasing appearance to the rubber articles and also protects them against various chemical influences. Since this protective layer does not become discolored on exposure to light, it can also be used for white and lightly colored articles.

*Example 2*

About 80 parts by weight of a polyester (containing about 8.5% of OH groups), obtained from about 5.1 mols of adipic acid, about 1 mol of phthalic acid anhydride and about 8.4 mols of hexanetriol are mixed with about 20 parts by weight of a polyester (containing about 6.5% of OH groups) obtained from about 1.43 mols of adipic acid, about 1 mol of hexanetriol and about 1 mol of 1,3-butylene glycol and vigorously stirred with an activator mixture consisting of about 1 part by weight of dimethyl benzylamine and about 5 parts by weight of an approximately 54% aqueous solution of the sodium salt of castor oil sulphate. This mixture is added while stirring to about 49 parts by weight of toluylene diisocyanate and about 49 parts by weight of p-isocyanato phenyl-phosphoric acid-triester, with much foaming. A foam material which has the following mechanical properties is formed:

Bulk density _____ kg./m.$^3$__ 46
Compressive strength_____ kg./cm.$^2$__ 2.6
Impact toughness_____ kg./cm.$^2$__ 0.2
Heat-bending strength_____degrees__ 145

Because of its higher viscosity, the isocyanate can be mixed very satisfactorily with the viscous polyesters. The foam materials are not brittle and do not show any shrinkage. The present isocyanate mixture containing at least about 50% of p-isocyanato phenyl-phosphoric acid-triester results in foam materials which are difficult to burn, and this resistance is also shown by the high heat-bending strength.

*Example 3*

About 80 parts by weight of a polyester obtained from about 5.1 mols of adipic acid, about 1 mol of phthalic acid anhydride and about 8.4 mols of hexanetriol and having about 8.5% of OH groups are mixed with about 20 parts by weight of a polyester (having about 6.5% of OH groups) obtained from about 1.43 mols of adipic acid, about 1 mol of hexanetriol and about 1 mol of 1,3-butylene glycol and vigorously stirred with an activator mixture of about 2 parts by weight of an ester prepared from about 2 mols of diethyl ethanolamine and about 1 mol of adipic acid, as well as about 6 parts by weight of an approximately 54% aqueous solution of the sodium salt of castor oil sulphate. This mixture is added, while stirring thoroughly, to about 140 parts by weight of p-isocyanato phenyl-phosphoric acid-triester and with much foaming, a foam material which has the following mechanical properties is obtained:

Bulk density_____kg./cm.$^3$__ 53
Compressive strength_____kg./cm.$^2$__ 2.4
Impact toughness_____kg./cm.__ 0.1
Heat-bending strength_____degrees__ 155

*Example 4*

About 100 parts by weight of a polyester (containing about 13.2% of OH groups) prepared from about 1 mol of adipic acid, about 2 mols of phthalic acid anhydride, about 1 mol of oleic acid and about 5 mols of glycerine are thoroughly mixed with the same activator mixture as in Example 2 and foamed with addition of about 44 parts by weight of toluylene diisocyanate and about 88 parts by weight of p-isocyanato phenyl-phosphoric acid-triester after thorough stirring. A foam material which is outstanding because of its improved heat-bending strength, and which in addition shows no shrinkage and is noninflammable, is obtained.

Bulk density _____ kg./m.$^3$__ 43
Compressive strength_____kg./cm.$^2$__ 2.3
Impact toughness_____kg./cm.__ 0.1
Heat-bending strength_____degrees__ 171

It is to be understood that any of the suitable phosphorous containing polyisocyanates more fully disclosed above as well as other organic compounds containing active hydrogen atoms and compounds having a molecular weight below 500 can be substituted in the foregoing examples with equally satisfactory results. Further, any compound which is known to react with an isocyanate to form a polyurethane can be used in the novel process provided by this invention.

*Example 5*

About 80 parts by weight of a polythioether prepared from about 1 mol of thiodiglycol, 0.3 mol of triethylene glycol and 0.1 mol of trimethylol propane (8.5% of OH groups) are mixed with 20 parts by weight of a polythioether prepared from about 1.43 mols of thiodiglycol, 1 mol of thrimethylol propane and 1 mol of triethylol propane (6.5% OH groups). A mixture consisting of 1 part by weight of dimethylbenzyl amine and 5 parts by weight of a 54% aqueous solution of the sodium salt of sulphonated castor oil are stirred into the above polythioether mixture. To this mixture are then added while intimately stirring 49 parts by weight of toluylene diisocyanate and 51 parts by weight of p-isocyanato phenyl thiophosphoric acid triester. With much foaming a foam material with good mechanical properties and a high heat-bending strength is obtained.

*Example 6*

About 300 parts by weight of a polybutylene glycol prepared by polymerization of tetrahydro furan (OH number 56; 1.7% of OH groups) are dehydrated at 120° C. for half an hour. Then, 108 parts by weight of p-isocyanato phenyl phosphoric acid diester-(N-methyl-N-phenyl)-monoamide are added. After 7 hours 6 parts by weight of 1.4 butylene glycol are stirred into the reaction mixture. The mixture is then poured into waxed molds and after-heated for 24 hours at 110° C. A rubber-elastic molding is obtained having good mechanical properties and a high heat-bending strength.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A process for the preparation of polyurethane plastics which comprises reacting an organic compound containing at least two active hydrogen containing groups as determined by the Zerewitinoff method, said groups being reactive with an —NCO group, with an isocyanato phosphorous compound having the formula

wherein X is selected from the group consisting of oxygen and sulfur, R is selected from the group consisting of O-aryl, O-aralkyl, O-alkaryl, O-indenyl, S-aryl, S-aralkyl, S-alkaryl, S-indenyl, N-(aryl)$_2$, N-(alkyl)(aryl), N-(alkaryl)$_2$, N(aralkyl)$_2$, and N-(indenyl)$_2$; R' and R" are selected from the group consisting of R as set out above, O-alkyl, O-cyclopentadienyl, S-alkyl, S-cyclopentadienyl, N-(alkyl)$_2$, and N-(cyclopentadienyl)$_2$; at least two aromatically bonded —NCO groups being present in the isocyanato phosphorous compound.

2. A product obtained by the process of claim 1.

3. Polyurethane plastics obtained by a process which comprises reacting an organic compound having a molecular weight of at least about 800 and containing at least two active hydrogen containing groups as determined by the Zerewitinoff method, said groups being reactive with an —NCO group, with an isocyanato phosphorous compound having the formula

wherein X is selected from the group consisting of oxygen and sulfur, R and R' are O-aryl and R" is N-(alkyl)(aryl), at least two aromatically bonded —NCO groups being present in the isocyanato phosphorous compound.

4. A polyurethane plastic prepared by a process which comprises reacting an organic compound having a molecular weight of at least about 800 and containing at least two active hydrogen containing groups as determined by the Zerewitinoff method, said groups being reactive with an—NCO group, under substantially anhydrous conditions with an excess of an isocyanato phosphorous compound having the formula

wherein X is selected from the group consisting of oxygen and sulfur, R and R' are O-aryl and R" is N-(alkyl)(aryl), at least two aromatically bonded —NCO groups being present in the isocyanato phosphorous compound, in a first step to prepare an —NCO terminated prepolymer and thereafter reacting said prepolymer with a member selected from the group consisting of water and an organic compound having at least two active hydrogen containing groups as determined by the Zerewitinoff method, said groups being reactive with an —NCO group and said compound having a molecular weight below about 500.

5. A cellular polyurethane plastic prepared by a process which comprises reacting water and an organic compound having a molecular weight of at least about 800 and containing at least two active hydrogen containing groups as determined by the Zerewitinoff method, said groups being reactive with an —NCO group, with an isocyanato phosphorous compound having the formula

wherein X is selected from the group consisting of oxygen and sulfur, R and R' are O-aryl and R" is N-(alkyl)(aryl), at least two aromatically bonded —NCO groups being present in the isocyanato phosporous compound.

6. Polyurethane plastics obtained by a process which comprises reacting an organic compound having a molecular weight of at least about 800, said organic compound being selected from the group consisting of polyhydric polyalkylene ethers, polyhydric polythioethers and hydroxyl polyesters obtained by a process which comprises condensing polyhydric alcohols and polycarboxylic acids, with an isocyanato phosphorous compound having the formula

wherein X is selected from the group consisting of oxygen and sulfur, R and R' are O-aryl and R" is N-(alkyl)(aryl), at least two aromatically bonded —NCO groups being present in the isocyanato phosporous compound.

7. A polyurethane plastic prepared by a process which comprises reacting an organic compound having a molecular weight of at least about 800, said organic compound being selected from the group consisting of polyhydric polyalkylene ethers, polyhydric polythioethers and hydroxyl polyesters obtained by a process which comprises condensing polyhydric alcohols and polycarboxylic acids, with an isocyanato phosphorous compound having the formula

wherein X is selected from the group consisting of oxygen and sulfur, R and R' are O-aryl and R" is N-(alkyl)(aryl), at least two aromatically bonded —NCO groups being present in the isocyanato phosphorous compound, in a first step to prepare an —NCO terminated prepolymer and thereafter reacting said prepolymer with a member selected from the group consisting of water and an organic compound having at least two active hydrogen containing groups as determined by the Zerewitinoff method, said groups being reactive with an —NCO group and said compound having a molecular weight below about 500.

8. A cellular polyurethane plastic prepared by a process which comprises which comprises reacting water and an organic compound having a molecular weight of at least about 800, said organic compound being selected from the group consisting of polyhydric polyalkylene ethers, polyhydric polythioethers and hydroxyl polyesters obtained by a process which comprises condensing polyhydric alcohols and polycarboxylic acids, with an excess of an isocyanato phosphorous compound having the formula

wherein X is selected from the group consisting of oxygen and sulfur, R and R' are O-aryl and R" is N-(alkyl)(aryl), at least two aromatically bonded —NCO groups being present in the isocyanato phosporous compound.

9. Polyurethane plastics prepared by a process which comprises reacting an organic compound having a molecular weight of at least about 800, said organic compound being selected from the group consisting of polyhydric polyalkylene ethers, polyhydric polythioethers and hydroxyl polyesters obtained by a process which comprises condensing polyhydric alcohols and polycarboxylic acids, with p-isocyanato phenyl-phosphoric acid-triester.

10. Polyurethane plastics prepared by a process which comprises reacting an organic compound having a molecular weight of at least about 800, said organic compound being selected from the group consisting of polyhydric polyalkylene ethers, polyhydric polythioethers and hydroxyl polyesters obtained by a process which comprises condensing polyhydric alcohols and polycarboxylic acids, with p-isocyanato phenyl-thiophosphoric acid-triester.

11. Polyurethane plastics prepared by a process which comprises reacting an organic compound having a molecular weight of at least about 800, said organic compound being selected from the group consisting of polyhydric polyalkylene ethers, polyhydric polythioethers and hydroxyl polyesters obtained by a process which comprises condensing polyhydric alcohols and polycarboxylic acids, with (3-isocyanato-5-methyl-phenyl) phosphoric acid-tri-ester.

12. Polyurethane plastics obtained by a process which comprises reacting an organic compound having a molecular weight of at least about 800, said organic compound being selected from the group consisting of polyhydric polyalkylene ethers, polyhydric polythioethers and hydroxyl polyesters obtained by a process which comprises condensing polyhydric alcohols and polycarboxylic acids, with an isocyanato phosphorous compound having the formula

wherein X is selected from the group consisting of oxygen and sulfur and R is O-aryl, at least two aromatically bonded —NCO groups being present in the isocyanato phosphorous compound.

13. Polyurethane plastics obtained by a process which comprises reacting an organic compound having a molecular weight of at least about 800, said organic compound being selected from the group consisting of polyhydric polyalkylene ethers, polyhydric polythioethers and hydroxyl polyesters obtained by a process which comprises condensing polyhydric alcohols and polycarboxylic acids, under substantially anhydrous conditions with an isocyanato phosphorous compound having the formula

wherein X is selected from the group consisting of oxygen and sulfur and R is O-aryl, at least two aromatically bonded —NCO groups being present in the isocyanato phosphorous compound, in a first step to prepare an —NCO terminated prepolymer and thereafter reacting said prepolymer with a member selected from the group consisting of water and a polyhydric alcohol having a molecular weight below about 500.

14. A cellular polyurethane plastic prepared by a process which comprises reacting water and an organic compound having a molecular weight of at least about 800, said organic compound being selected from the group consisting of polyhydric polyalkylene ethers, polyhydric polythioethers and hydroxyl polyesters obtained by a process which comprises condensing polyhydric alcohols and polycarboxylic acids, with an isocyanato phosphorous compound having the formula

wherein X is selected from the group consisting of oxygen and sulfur and R is O-aryl, at least two aromatically bonded —NCO groups being present in the isocyanato phosphorous compound.

References Cited in the file of this patent

UNITED STATES PATENTS

| | | |
|---|---|---|
| 2,691,566 | Kvalnes | Oct. 12, 1954 |
| 2,691,567 | Kvalnes | Oct. 12, 1954 |
| 2,835,652 | Haven | May 20, 1958 |

OTHER REFERENCES

Butterworths Scientific Pub. "Nomenclature of Organic Chemistry" (London), 1957, p. 22, copyright 1958.